(12) United States Patent
Buerkle et al.

(10) Patent No.: US 8,805,604 B2
(45) Date of Patent: Aug. 12, 2014

(54) METHOD FOR ADJUSTING A STEERING SYSTEM IN A VEHICLE

(75) Inventors: Lutz Buerkle, Leonberg (DE); Michael Weilkes, Diekholzen (DE); Tobias Rentschler, Pforzheim (DE)

(73) Assignee: Robert Bosch GmbH, Stuttgart (DE)

( * ) Notice: Subject to any disclaimer, the term of this patent is extended or adjusted under 35 U.S.C. 154(b) by 1142 days.

(21) Appl. No.: 12/305,726

(22) PCT Filed: Oct. 26, 2007

(86) PCT No.: PCT/EP2007/061524
§ 371 (c)(1),
(2), (4) Date: May 11, 2010

(87) PCT Pub. No.: WO2008/077668
PCT Pub. Date: Jul. 3, 2008

(65) Prior Publication Data
US 2010/0228438 A1    Sep. 9, 2010

(30) Foreign Application Priority Data

Dec. 21, 2006  (DE) .......................... 10 2006 060 628

(51) Int. Cl.
*B60W 10/20*    (2006.01)
*B62D 15/02*    (2006.01)

(52) U.S. Cl.
CPC .................................. *B62D 15/025* (2013.01)
USPC ............................................ 701/41; 477/107

(58) Field of Classification Search
CPC combination set(s) only.
See application file for complete search history.

(56) References Cited

U.S. PATENT DOCUMENTS

| 6,134,491 | A  | * | 10/2000 | Kawagoe et al. ............... 701/43 |
| 6,679,807 | B2 | * | 1/2004 | Kato et al. ..................... 477/107 |
| 2005/0004731 | A1 | | 1/2005 | Bohm et al. |
| 2006/0047390 | A1 | | 3/2006 | Scherl et al. |
| 2007/0219688 | A1 | | 9/2007 | Gut et al. |

FOREIGN PATENT DOCUMENTS

| DE | 10137292 | 3/2003 |
| DE | 102004037298 | 3/2006 |
| JP | 2000198458 | 7/2000 |
| JP | 2001048035 | 2/2001 |
| JP | 2001088723 | 4/2001 |
| WO | WO 2005/047045 | 5/2005 |

* cited by examiner

*Primary Examiner* — Luna Champagne
(74) *Attorney, Agent, or Firm* — Kenyon & Kenyon LLP

(57) ABSTRACT

In a method for adjusting a steering system in a vehicle, a setpoint trajectory is produced to which a tolerance corridor is assigned, a basic steering torque for guiding the vehicle within the tolerance corridor being generated. In the event that the vehicle leaves the tolerance corridor, a steering guidance torque which acts upon the vehicle in the direction of the tolerance corridor is superimposed on the basic steering torque.

14 Claims, 3 Drawing Sheets

METHOD FOR ADJUSTING A STEERING SYSTEM IN A VEHICLE

FIELD OF THE INVENTION

The present invention relates to a method for adjusting a steering system in a vehicle.

BACKGROUND INFORMATION

German Patent Application No. DE 101 37 292 A1 describes a driver assistance system in which ambient data and the vehicle motion are registered or estimated and referenced to each other, whereupon a steering assistance torque is generated or adapted in the steering system. This is realized by registering the course of the roadway and ascertaining an appropriate setpoint trajectory for the vehicle movement, which is compared with the actual path of the vehicle, whereupon an assisting steering torque is produced to correct the steering. In this way, the vehicle is able to follow the traffic lane even without intervention by the driver.

A method for adapting lane width in a lane keeping system is described in German Patent Application No. DE 10 2004 037 298 A1. In order to keep the vehicle in the traffic lane, first the course and the width of the traffic lane are ascertained through a video system carried in the vehicle, these values being used as the basis for calculating a setpoint trajectory that represents the ideal line. A deviation of the vehicle trajectory from the setpoint trajectory is permitted; when that deviation is exceeded, a driver-independent steering wheel torque is exerted on the steering wheel. If the magnitude of the deviation of the vehicle trajectory from the setpoint trajectory is below a threshold value, no intervention occurs; steering of the vehicle is left to the driver.

SUMMARY

An object of the present invention is to assist the driver during steering. On the one hand, largely autonomous steering should be possible; on the other hand, attention deficits on the part of the driver should be prevented.

In an example method according to the present invention for adjusting a steering system in a vehicle, a setpoint trajectory adapted to the ambient situation is produced, after which a steering torque is set in the steering system in such a way that the vehicle follows the setpoint trajectory. As soon as the driving lane is detected, the road curvature is able to be ascertained therefrom. The setpoint trajectory is ascertained on the basis of the road curvature, and the basic steering torque which will hold the vehicle on the setpoint trajectory is calculated in a mathematical vehicle model; this is carried out in particular in the steering system in a regulating and control unit. According to the example embodiment of the present invention, a tolerance corridor is assigned to the setpoint trajectory. In the event that the vehicle leaves the tolerance corridor, a steering guidance torque that guides the vehicle back in the direction of the tolerance corridor is superimposed on the basic steering torque.

Predefining the setpoint trajectory and generating the basic steering torque in the steering system cause the steering system to be adjusted so that the vehicle follows the setpoint trajectory. This enables largely autonomous guidance of the vehicle on the basis of detected ambient data. The tolerance corridor within which the driver may perform small steering motions is predefined at the same time, whereby for example ambient influences such as windage or the like are able to be compensated for. Since the driver is able to perform a steering function, the driver's attention does not decrease. If the vehicle leaves the tolerance corridor, the steering guidance torque is superimposed on the basic steering torque, causing the vehicle to be steered back in the direction of the tolerance corridor. The driver experiences this steering guidance torque as an increased resistance torque in the steering handling against additional deflections that would move the vehicle even farther outside the tolerance corridor, so that the driver is immediately able to recognize and correct his own steering error. Even if the driver does not perform any corrective steering movement, the vehicle is guided back into the tolerance corridor by the intervention with the aid of the steering guidance torque. Dangerous situations that may occur, for example due to the driver momentarily falling asleep, are thereby defused.

The basic steering torque is defined as the torque that is necessary to compensate for the restoring torque that prevails in the steering system. Thus, an equilibrium of torques prevails in the steering system in stationary conditions. In conventional steering systems this basic steering torque must be applied by the driver for the steering system to execute the desired steering angle. In the object of the present invention, in contrast, this basic steering torque is generated autonomously by the system, so that intervention by the driver is not absolutely necessary. Nevertheless, it may be expedient to use recognition systems to ensure that the driver is touching the steering grip, in order to force the driver to pay attention. If the hand or hands are removed from the steering grip without permission, a warning is issued; at the same time, the vehicle steering assistance may also be halted.

Expediently, within the tolerance corridor, the basic steering torque may be exclusively effective as the steering torque generated by the steering system. Accordingly, if the vehicle moves within the tolerance corridor, no steering guidance torque is produced; instead, it is up to the driver to move within the tolerance corridor by appropriate steering movements. The steering guidance torque that is superimposed on the basic steering torque is generated only outside of the tolerance corridor.

Both the basic steering torque and the steering guidance torque may be generated as a function of various vehicle condition and operating variables, for example as a function of the vehicle velocity; in this case in particular a dependence on the square of the vehicle velocity comes into play. The vehicle condition and operating variables are ascertained expediently using an inertial sensor system, i.e., a sensor system installed in the vehicle. In addition to the longitudinal vehicle dynamics, consideration may also be given to the transverse vehicle dynamics, in particular the yaw rate and lateral acceleration.

Various methods may be used to ascertain the course of the road which is to be used as the basis for calculating the setpoint trajectory. It is possible to utilize an optical lane recognition system, in particular a video lane recognition system, with which the traffic lane is picked up optically and evaluated in a regulating and control unit. In addition or alternatively, a navigation system may also be utilized to ascertain the relative position of the vehicle in reference to the traffic lane by aligning the absolute position of the vehicle with electronically stored map material.

There are also various ways of ascertaining the tolerance corridor. Here values for the corridor are calculated, in particular depending on the situation, as a function of current surroundings variables and/or vehicle-related variables such as vehicle velocity or yaw rate.

In order to leave the final control over steering to the driver, maximum values are expediently predefined for the basic steering torque, the steering guidance torque, and possibly also for the sum of the basic steering torque and steering guidance torque. The result of this is that the driver ultimately determines the course of the vehicle, since the driver is able to apply a manual torque that surpasses the torques generated by the system.

The steering system in which the process is carried out includes a steering grip—normally a steering wheel—, a steering shaft, a steering linkage, a steering gear and a servomotor. In addition, a surroundings detection system and the regulating and control unit are provided. A steering wheel angle is transmitted through the steering grip and the steering shaft to the steering gear and on to the steering linkage, whereby the wheel steering angles are set at the steered wheels. The assisting torques, which include the basic steering torque and the steering guidance torque, are produced via the servomotor or an additional motor in the steering system. The course of the driving lane is ascertained in the surroundings detection system, this information being processed in the regulating and control unit, in which control variables are also produced for adjusting the servomotor.

DETAILED DESCRIPTION OF EXAMPLE EMBODIMENTS

Figure 1:
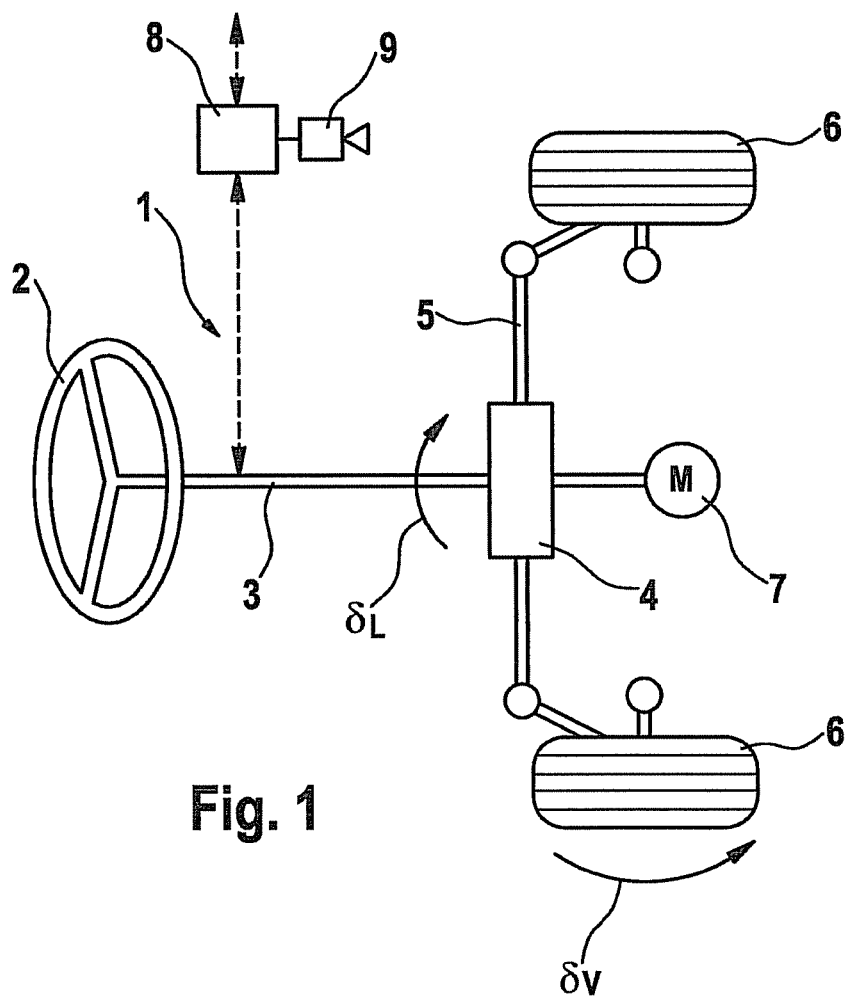
FIG. 1 shows a schematic depiction of a steering system in a motor vehicle.

Steering system 1 depicted in FIG. 1 is used in motor vehicles; it includes a steering grip in the form of a steering wheel 2, which is coupled to a steering shaft 3, via which a steering wheel angle predefined by the driver is able to be transmitted to a steering linkage 5. Steering shaft 3 and steering linkage 5 are connected by a steering gear 4 via which the steering wheel angle is converted to a wheel steering angle of the steered front wheels 6. An additional assisting torque is fed into steering system 1 by a motor 7, normally an electric servomotor, although hydraulic actuators are also a possibility.

Also provided is a regulating and control unit 8, which is expediently a component of steering system 1 and receives signals from the latter or sends signals to it. If appropriate, regulating and control unit 8 is also a component of a central control unit in the vehicle, which is connected to steering system 1, for example via CAN lines.

Also situated in vehicle 10 is a lane recognition system 9, also assigned to steering system 1, for example a video lane recognition system via which the traffic lane may be detected.

It is possible to use the information about the traffic lane to ascertain a setpoint trajectory that is used as the basis for guiding the vehicle. Optical system 9 is used to determine the traffic lane curvature and also the position of the vehicle relative to the traffic lane, in particular the lateral offset and the orientation relative to the traffic lane. An inertial sensor system may be used to send vehicle-related condition and operating variables, in particular variables for the state of longitudinal and transverse vehicle dynamics such as the vehicle velocity and the yaw rate, to regulating and control unit 8. This information may be used to ascertain the deviation between the calculated setpoint trajectory and the actual position of the vehicle and send it to a regulating circuit, via which a torque is generated in steering system 1 which forces the vehicle onto the setpoint trajectory. The artificially generated steering torque is fed in through motor 7.

Figure 2:
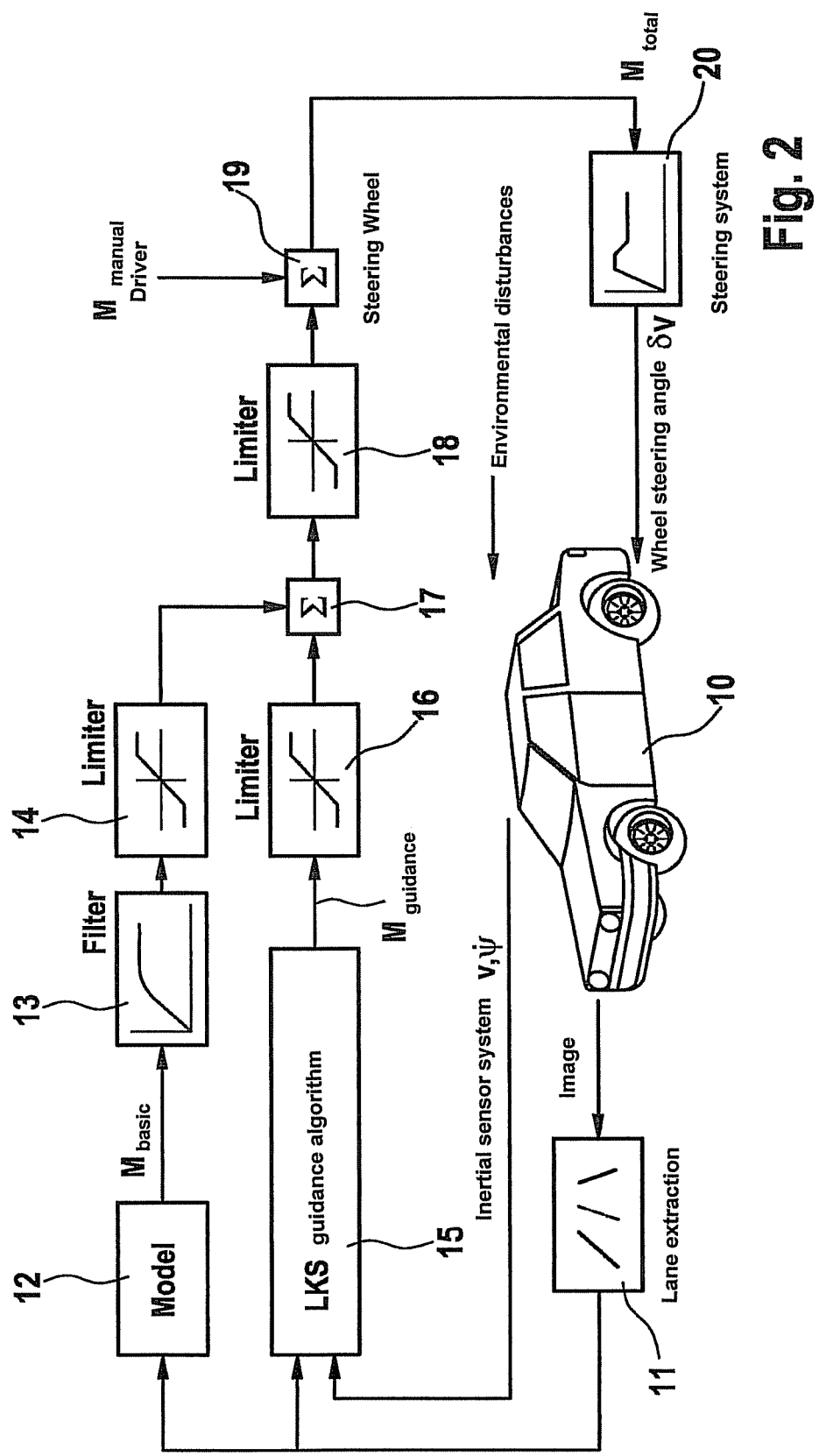
FIG. 2 shows a schematic depiction of a block diagram for carrying out a method for adjusting the steering system in the vehicle.

FIG. 2 depicts a block diagram with the sequence of the method for adjusting the steering system. In motor vehicle 10 an image of the surroundings is first produced in process step 11 with the aid of the lane recognition system, the traffic lane then being extracted therefrom. When the traffic lane is known, it is also possible to calculate the setpoint trajectory that vehicle 10 is to follow in the optimal case. In a next process step 12 this information is processed in a mathematical vehicle model, from which a basic steering torque $M_{basic}$ is determined for guiding the vehicle along the setpoint trajectory. Basic steering torque $M_{basic}$ is calculated from the following relationship:

$$M_{basic} = \frac{l_h \cdot n_r \cdot m \cdot v^2 \cdot K_R \cdot k_{servo}}{l \cdot N}$$

where $l_h$ designates the distance from the center of mass of the vehicle to the rear axle, $n_R$ designates a caster determined by the design, m designates the vehicle mass, v designates the vehicle velocity, l designates the wheelbase, N designates the transmission ratio of the steering gear, $K_R$ designates the road curvature, and $k_{servo}$ designates the degree of assistance of the power steering.

This basic torque $M_{basic}$ is subjected to filtering in process step 13, and then in process step 14 its magnitude is limited to a maximum value in a limiter.

Parallel to the branch in which basic steering torque $M_{basic}$ is determined, a steering guidance torque $M_{guidance}$ may optionally be calculated as needed. This steering guidance torque $M_{guidance}$ is generated only in the event that the vehicle departs from a tolerance corridor that is assigned to the setpoint trajectory. If the vehicle instead moves within the tolerance corridor, no steering guidance torque $M_{guidance}$ is generated; in this case only basic steering torque $M_{basic}$ is generated.

In process step 15, steering guidance torque $M_{guidance}$ is generated in a guidance algorithm that is also referred to as Lane Keeping Support (LKS). Guidance algorithm 15, like vehicle model 12, is fed the information from preceding process step 11, i.e., the setpoint trajectory as well as the deviation of the actual position of the vehicle from the setpoint trajectory. Other data passed to guidance algorithm 15 also include functions from an inertial sensor system that is carried in vehicle 10, through which vehicle condition and operating variables are ascertained, in particular vehicle velocity v and yaw rate $\Psi$. Environmental disturbances that act on the vehicle as disturbances, for example wind effects, may also be fed to guidance algorithm 15 as input values.

If it is detected in guidance algorithm 15 that the vehicle is outside of the permissible tolerance corridor, additional steering guidance torque $M_{guidance}$ is generated, the magnitude thereof being limited in the subsequent process step 16 to a maximum permissible value in a limiter. Then in process step 17 basic steering torque $M_{basic}$ and steering guidance torque $M_{guidance}$ are added together; in subsequent step 18 the magnitude of the resulting total torque may also be limited to a maximum permissible value in a limiter.

In subsequent process step 19 another additive overlay occurs, this time with manual torque $M_{manual}$ produced by the driver, which the driver predefines using the steering wheel. In next process step 20 resulting total torque $M_{total}$ is then converted in the steering system to resulting wheel steering angle $\delta_v$, which is set at the steerable front wheels of vehicle 10.

Figure 3:
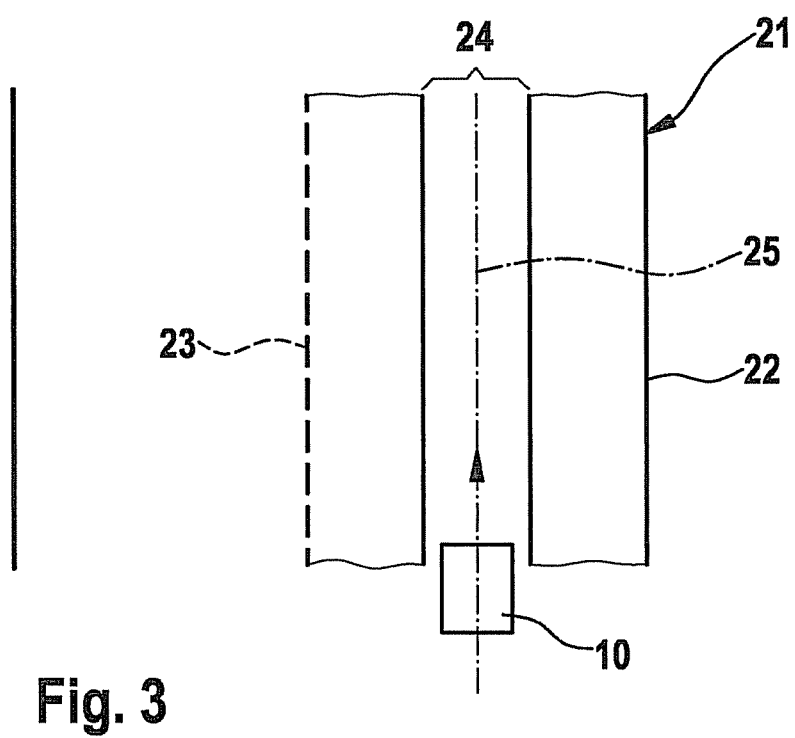
FIG. 3 shows the position of a vehicle within a permissible corridor in the driving lane.

FIG. 3 shows a schematic top view of a traffic lane 21 with a vehicle 10. Traffic lane 21 is limited in the direction of travel of vehicle 10 by lateral traffic lane markings 22 and 23, a permissible corridor 24 being designated within these lateral boundaries within which vehicle 10 may move without correction using an additional steering guidance torque $M_{guidance}$.

Also plotted in FIG. 3 is a setpoint trajectory 25, which depicts the optimal travel path for vehicle 10 and which the vehicle follows automatically by adjusting basic steering torque $M_{basic}$ accordingly. This setpoint trajectory 25 may run corresponding to traffic lane 21 at an optimal lateral distance from traffic lane markings 22 and 23, or may be offset from it. Corridor 24 surrounds setpoint trajectory 25 at a lateral distance to the left and right, the lateral distance marking the tolerance range within which vehicle 10 may move without leaving setpoint trajectory 25. Only if the vehicle moves outside of corridor 24 is a steering guidance torque $M_{guidance}$ generated as a steering correction which acts upon the vehicle to return into corridor 24.

What is claimed is:

1. A method for adjusting a steering system in a vehicle, in which a setpoint trajectory adapted to an ambient situation is produced and a steering torque is adjusted in the steering system so that the vehicle follows the setpoint trajectory, the method comprising:
    assigning a tolerance corridor to the setpoint trajectory;
    producing a basic steering torque for guiding the vehicle within the tolerance corridor, wherein the basic steering torque is calculated as a function of vehicle dynamics variables, as a value that compensates for a restoring torque prevailing in the steering system to keep the vehicle along the setpoint trajectory in the absence of any driver steering input; and
    conditional upon the vehicle leaving the tolerance corridor:
        calculating a steering guidance torque as a function of the vehicle dynamics variable, as a value that acts upon the vehicle in a direction of the tolerance corridor to guide the vehicle back towards the tolerance corridor; and
        superimposing the steering guidance torque on the basic steering torque and a driver input torque to calculate a total torque as a sum of the steering guidance torque, the basic steering torque, and the driver input torque.

2. The method as recited in claim 1, wherein at least one of the basic steering torque and the steering guidance torque is calculated as a function of at least one of a longitudinal vehicle dynamics and a transverse vehicle dynamics.

3. The method as recited in claim 2, wherein the at least one of the basic steering torque and the steering guidance torque is calculated as a function of a velocity of the vehicle.

4. The method as recited in claim 3, wherein the at least one of the basic steering torque and the steering guidance torque is calculated as a function of the square of a velocity of the vehicle.

5. The method as recited in claim 1, wherein the basic steering torque is calculated according to the following relationship:

$$M_{basic} = \frac{l_n \cdot n_r \cdot m \cdot v^2 \cdot K_R \cdot k_{servo}}{l \cdot N}$$

where
$M_{basic}$ denotes the basic steering torque,
$l_h$ a distance from a center of mass of the vehicle to a rear axle of the vehicle,
$n_R$ a caster,
m a vehicle mass of the vehicle,
v a velocity of the vehicle,
l a wheelbase of the vehicle,
N a transmission ratio of a steering gear of the vehicle,
$K_R$ a curvature of a road, and $K_{servo}$ a degree of assistance of a power steering.

6. The method as recited in claim 1, wherein a road curvature is measured and the basic steering torque is ascertained based on the road curvature in a mathematical vehicle model.

7. The method as recited in claim 6, wherein a course of the road is ascertained using a video lane recognition system.

8. The method as recited in claim 7, wherein the course of the road is ascertained using a navigation system.

9. The method as recited in claim 1, wherein the tolerance corridor is ascertained as a function of at least one of vehicle-related variables, and surroundings variables.

10. The method as recited in claim 1, wherein a magnitude of the basic steering torque is limited to a maximum value.

11. The method as recited in claim 1, wherein a magnitude of the steering guidance torque is limited to a maximum value.

12. The method as recited in claim 1, wherein a magnitude of a sum of the basic steering torque and the steering guidance torque is limited to a maximum value.

13. A regulating and control unit adapted to:
    assign a tolerance corridor to a setpoint trajectory of a vehicle;
    produce a basic steering torque to guide the vehicle within the tolerance corridor, wherein the basic steering torque is calculated as a function of vehicle dynamics variables, as a value that compensates for a restoring torque prevailing in a steering system of the vehicle to keep the vehicle along the setpoint trajectory in the absence of any driver steering input; and
    conditional upon the vehicle leaving the tolerance corridor:
        calculate a steering guidance torque as a function of the vehicle dynamics variable, as a value that acts upon the vehicle in a direction of the tolerance corridor to guide the vehicle back towards the tolerance corridor; and
        superimpose the steering guidance torque on the basic steering torque and a driver input torque to calculate a total torque as a sum of the steering guidance torque, the basic steering torque, and the driver input torque.

14. A steering system in a vehicle, comprising:
    a steering grip;
    a steering shaft coupled to the steering grip;
    a steering linkage and a steering gear coupled to the steering shaft; and
    a regulating and control unit adapted to:
        assign a tolerance corridor to a setpoint trajectory of a vehicle;
        produce a basic steering torque to guide the vehicle within the tolerance corridor, wherein the basic steering torque is calculated as a function of vehicle dynamics variables, as a value that compensates for a restoring torque prevailing in the steering system to keep the vehicle along the setpoint trajectory in the absence of any driver steering input; and
        conditional upon the vehicle leaving the tolerance corridor:

calculate a steering guidance torque as a function of the vehicle dynamics variable, as a value that acts upon the vehicle in a direction of the tolerance corridor to guide the vehicle back towards the tolerance corridor; and superimpose the steering guidance torque on the basic steering torque and a driver input torque to calculate a total torque as a sum of the steering guidance torque, the basic steering torque, and the driver input torque.

\* \* \* \* \*